United States Patent
Endoh

(10) Patent No.: US 7,280,461 B2
(45) Date of Patent: Oct. 9, 2007

(54) OPTICAL RECORDING/REPRODUCING MEDIUM, STAMPER FOR MANUFACTURING OPTICAL RECORDING/REPRODUCING MEDIUM, AND OPTICAL RECORDING/REPRODUCING APPARATUS

(75) Inventor: Sohmei Endoh, Tokyo (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 10/491,444

(22) PCT Filed: Oct. 16, 2002

(86) PCT No.: PCT/JP02/10742

§ 371 (c)(1),
(2), (4) Date: Apr. 14, 2004

(87) PCT Pub. No.: WO03/041064

PCT Pub. Date: May 15, 2003

(65) Prior Publication Data

US 2004/0246882 A1 Dec. 9, 2004

(30) Foreign Application Priority Data

Oct. 16, 2001 (JP) ............................. 2001-318420

(51) Int. Cl.
 *G11B 7/24* (2006.01)
(52) U.S. Cl. ................................. 369/275.4; 369/275.3

(58) Field of Classification Search .. 369/275.1–275.5, 369/277–284, 44.26, 286, 288; 428/64.4
See application file for complete search history.

(56) References Cited

U.S. PATENT DOCUMENTS

| 6,069,868 A * | 5/2000 | Kashiwagi ............... 369/275.1 |
| 6,906,993 B2 * | 6/2005 | Wang et al. ............. 369/275.3 |
| 6,906,994 B2 * | 6/2005 | Lee et al. ................ 369/275.4 |
| 7,016,295 B2 * | 3/2006 | Rilum et al. ............. 369/275.4 |
| 7,035,198 B2 * | 4/2006 | Sako et al. .............. 369/275.3 |

FOREIGN PATENT DOCUMENTS

| JP | 05-036087 | 2/1993 |
| JP | 11-328735 | 11/1999 |
| JP | 2000-298878 | 10/2000 |
| JP | 2000-348379 | 12/2000 |
| JP | 2001-209975 | 8/2001 |

* cited by examiner

Primary Examiner—Ali Neyzari
(74) Attorney, Agent, or Firm—Oblon, Spivak, McClelland, Maier & Neustadt, P.C.

(57) ABSTRACT

An optical recording and reproduction medium in which pits corresponding to recording information are formed along a recording track, wherein auxiliary pits are formed in at least a portion of the spaces between adjacent pits along the recording track direction; when the pit depth is d1 and the auxiliary pit depth is d2, then $d1 \geq d2$ is obtained; and both edges of the auxiliary pits along the recording track direction are shaped as simple convex curves.

21 Claims, 6 Drawing Sheets

OPTICAL RECORDING/REPRODUCING MEDIUM, STAMPER FOR MANUFACTURING OPTICAL RECORDING/REPRODUCING MEDIUM, AND OPTICAL RECORDING/REPRODUCING APPARATUS

TECHNICAL FIELD

This invention relates to an optical recording and reproduction medium in which pits corresponding to recorded information are formed along recording tracks, a stamper for manufacturing the optical recording and reproduction medium, and an optical recording and reproducing device.

BACKGROUND ART

Various optical discs, formed in a disc shape and onto which optical recording and/or reproduction are performed, are currently in use as optical recording/reproduction media. Such optical discs include read-only optical discs, in which embossed pits corresponding to data are formed in advance in the disc substrate; magneto-optical discs, which utilize a magneto-optical effect to perform data recording; and phase-change optical discs, which use phase changes in the recording film to perform data recording.

Of these discs, in optical discs enabling writing, such as magneto-optical discs and phase-change optical discs, grooves are conventionally formed in the disc substrate along recording tracks. Here a "groove" is a so-called guide groove formed along the recording track mainly in order to enable execution of tracking servo; the intervals between the ends of the groove apertures are called lands.

In the case of an optical disc in which grooves are formed, conventionally a tracking servo is configured using a tracking error signal based on the push-pull signal obtained from light reflected and diffracted by the grooves. Here a push-pull signal is obtained by detecting light reflected and diffracted by a groove using two photodetectors positioned symmetrically with respect to the groove center, and taking the difference in outputs of the two photodetectors.

Conventionally in the case of such optical discs, by improving the reproduction resolution of the optical pickup mounted in the reproducing device, high recording densities have been achieved. Improvement of the reproduction resolution of the optical pickup has been optically realized mainly by shortening the wavelength λ of the laser light used for data reproduction, and increasing the numerical aperture NA of the objective lens which condenses the laser light on the optical disc.

Conventionally, in each of the formats of so-called CD-R or write-once compact discs (CDs) and rewritable MDs (Mini-Discs) which are magneto-optical (MO) discs, write-once DVD-R type DVDs (Digital Versatile Discs), and so-called DVD+RW or DVD-RW (both registered trademarks for optical discs) which are rewritable DVDs, a groove recording format in which grooves are recorded has been proposed. In each of the formats of ISO system magneto-optical discs, land recording formats in which recording on lands is performed have been proposed.

On the other hand, in DVD-RAM (Random Access Memory) and similar formats, as a method of realizing optical discs with high densities a so-called land/groove recording method has been proposed in which on both grooves and lands data are recorded to double the track density compared with the conventional one.

Land/groove recording methods are also being studied for use in high-density optical discs being developed in recent years as next-generation optical discs, such as DVR (Digital Video Recordable) or Blu-ray Discs, and μ-Discs or the like which are small-sized MDs, and using the methods efforts are being made to raise recording densities.

However, when performing land/groove recording on DVD-RAM or other media, if the focus point is not separately adjusted during recording and reproduction for recording on lands and recording on grooves, optimal recording/reproduction characteristics are not obtained, and so there is the disadvantage of a more complex optical system.

Further, in "ISOM 2000 Simulation of Heat Generation and Conduction on Land/Groove Disc", it is reported that recording beam shapes are different in recording on lands and in recording on grooves, and clearly it is difficult to obtain uniform land recording/reproduction characteristics and groove recording/reproduction characteristics, so that there is the problem of regions with different recording/reproduction characteristics existing in the same optical recording/reproduction medium.

Further, in Blu-ray Discs and other high-density optical discs, the recording/reproduction characteristics are satisfactory near the reading surface, which in the case of Blu-ray Discs is on the lands nearer the light irradiation side, though the recording/reproduction characteristics are poor away from the reading surface, which in the case of Blu-ray Discs is the grooves farther from the light irradiation side.

In DVD-ROM (Read-Only Memory) discs and similar, at present it is possible to directly record signals in such a land/groove recording format; however, satisfactory and uniform recording/reproduction characteristics in recording on lands and in recording on grooves are desired.

Further, as described above, in Blu-ray Discs and other high-density optical discs the groove portions are away from the reading surface, and it is difficult to obtain satisfactory recording/reproduction characteristics in these groove portions.

On the other hand, in processes to manufacture an optical recording/reproduction medium, a method is conceivable in which the depression/protrusion pattern to be formed in the substrate is inverted for manufacturing. That is, in conventional processes to manufacture an optical recording/reproduction medium, photolithography or other means are used to form a minute depression/protrusion pattern in the photosensing layer of the glass master, and then plating or other means are employed to form a master stamper of, for example, nickel.

Then, either by an injection molding method in which this master stamper is positioned in a die or other equipment and a resin is injected, or by a so-called 2P (photo-polymerization) method in which an ultraviolet-curing resin, for example, is applied to the substrate and this stamper is pressed into the resin layer to form the desired depression/protrusion pattern, the substrate of the optical recording/reproduction medium in which the predetermined minute depression/protrusion pattern is formed in the surface can be formed.

Thus as described above, when groove portions are provided on the side farther from the reading light and satisfactory recording/reproduction characteristics cannot be maintained, a replica of the above-described master stamper, that is, a so-called mother stamper may be formed by transcription using electroplating or other methods to invert the depression/protrusion pattern and to obtain a configuration of the groove pattern on the substrate provided on the side closer to the reading light, thereby improving the recording/reproduction characteristics.

However, when a groove recording or land recording format is adopted, if an attempt is made to achieve high recording densities similar to the case of a land/groove recording format, then the track density must be set to double that of the case of a land/groove recording format, that is, the track pitch must be reduced to half; consequently the amplitude of the push-pull signal or other tracking servo signal is reduced, so that stable tracking and the reproduction of wobble signals become difficult.

For example, a land/groove recording format may have a track pitch of 0.60 μm, that is, a land width of 0.30 μm and a groove width of 0.30 μm, and the push-pull signal amplitude is approximately 90%.

However, when attempting to achieve a similar recording density using a groove recording format, if the track pitch is set to 0.32 μm, the push-pull signal amplitude is approximately 18%.

In conventional optical discs, the track pitch is set to the track pitch corresponding to a cutoff frequency of an optical pickup of a reproducing device, that is, approximately $\frac{2}{3}$ to twice a spatial frequency. The cutoff frequency is the frequency at which the reproduction signal amplitude is substantially zero; if the wavelength of the laser light used for data reproduction is $\lambda$, and the numerical aperture of the objective lens focusing the laser light on the optical disc is NA, then the cutoff frequency is represented by $2NA/\lambda$.

In the case of DVRs and the above-described Blu-ray Discs, the numerical aperture NA is 0.85±0.05, and the wavelength $\lambda$ of reproduction light is 405±10 nm. If the numerical aperture NA is for example 0.85 and the reproduction light wavelength $\lambda$ is for example 406 nm, then the cutoff frequency ($2NA/\lambda$) is 4187 lines/mm, and the track pitch corresponding to this is 0.239 μm.

If the track pitch of DVR and Blu-ray Discs is 0.32 μm, then this is approximately $\frac{4}{3}$ (0.32/0.239=1.339) of the track pitch corresponding to the cutoff frequency 0.239 μm.

The reason for conventionally setting the track pitch to approximately $\frac{2}{3}$ to twice the track pitch corresponding to the cutoff frequency is that, in order to obtain stabilized tracking servo operation and to reproduce a stable wobble signal, it is required to obtain a tracking servo signal amplitude at a sufficient level.

The high-density optical discs of recent years use a push-pull signal as the tracking error signal; however, in order to perform stable tracking servo operation, the push-pull signal amplitude ratio must be approximately 0.135 or more. Further, it is desirable that measures be taken to enable stable reproduction of the wobble signal.

On the other hand, apart from recording on grooves, a format is proposed in which TOC (Table of Contents) and other information is recorded as pits. However, because the density of pits in the circumferential direction is approximately half of that of grooves, there is the disadvantage that the tracking servo signal amplitude (push-pull signal amplitude) is reduced to half.

That is, if an attempt is made to increase the density with the above-described DVR and Blu-ray Disc track pitch being set to 0.32 μm, the push-pull signal amplitude for pits falls to approximately 9% (18%/2), so that tracking servo operation becomes difficult. Also, the pit depth at which the push-pull signal amplitude is maximum is approximately $\frac{1}{8}$ of the wavelength $\lambda$ of the optical pickup, and pit widths are approximately half the track pitch, so that the pit push-pull signal amplitude is improved to 12%, but tracking servo operation becomes unstable.

DISCLOSURE OF THE INVENTION

On the other hand, in Japanese Patent Application No. 2002-34242 related to this application, by the same applicants as the present invention, in the above-described DVR, Blu-ray Discs and other high-density optical recording/reproduction media, by selecting the phase depth x of the grooves to be $$\lambda/16.14xn \leq x \leq \lambda/4.99n$$

satisfactory recording/reproduction characteristics are obtained, even when the track pitch is set to 0.32 μm, that is, approximately $\frac{4}{3}$ times the track pitch corresponding to the cutoff frequency, as described above. In the above formula, n represents the refractive index of the medium from the incident angle of the incident light for reproduction to the groove.

However, if an attempt is made to similarly set the pit signal depth, there is a problem that sufficient recording/reproduction characteristics are not obtained for the signals of comparatively shallow pits with a phase depth of approximately $\lambda/16n \leq x \leq \lambda/12n$, that is, in one example, inserting $\lambda$=406 nm and n=1.48, a depth of approximately 17 to 23 nm.

In order to resolve the above-described problems and execute stable tracking servo control without the occurrence of fluctuations in the recording/reproduction characteristics, the present invention has the object of providing a practically high-density optical recording/reproduction medium, a stamper for manufacturing the optical recording/reproduction medium, and an optical recording/reproducing device such that push-pull signal amplitudes sufficient for stable tracking servo control are obtained even in pit portions.

The present invention is an optical recording/reproduction medium in which pits corresponding to recorded information are formed along recording tracks, wherein auxiliary pits are formed in at least a portion of the space between adjacent pits along the direction of a recording track, configured such that, if the depth of pits is d1 and the depth of auxiliary pits is d2, then d1≧d2, and both edges of the auxiliary pits along the recording track direction are shaped as simple convex curves.

Further, the present invention is the optical recording/reproduction medium having the above-described configuration, wherein when with respect to the optical recording/reproduction medium the refractive index of the medium from the light entering surface to a pit is n, the wavelength of the incident light used for reproducing the recorded information of pits is $\lambda$, the pit phase depth is x1, and the auxiliary pit phase depth is x2, then $$\lambda/13.06n \leq x1 \leq \lambda/5.84n \tag{1}$$

$$\lambda/16.14n \leq x2 \leq x1 \tag{2}$$

Further, the present invention is the optical recording/reproduction medium having the above-described configuration, wherein the wavelength $\lambda$ of incident light for reproduction is 405±10 nm, and the numerical aperture NA of the objective lens is 0.85±0.05.

Further, the present invention is the optical recording/reproduction medium having the above-described configuration, wherein a track pitch of the pit is greater than or equal to $\frac{4}{3}$ of, but less than $\frac{3}{2}$ of, a track pitch of the cutoff frequency corresponding to the wavelength $\lambda$ of the incident light for reproduction and corresponding to the numerical aperture NA of the objective lens.

Further, the present invention is the optical recording/reproduction medium in each of the above-described configurations, wherein when the spaces between pits are the shortest spaces as determined by the modulation method of recording information, auxiliary pits are not provided.

Further, the present invention is the optical recording/reproduction medium in each of the above-described configurations, wherein grooves are formed intermixed with pits.

Further, the present invention is the optical recording/reproduction medium in each of the above-described configurations, wherein the track pitch of pits and the track pitch of grooves are the same.

Further, the present invention is the optical recording/reproduction medium having the above-described configuration, wherein the modulation method for pits, and the modulation method for recording information recorded in grooves, are the same.

Further, the present invention is a stamper for manufacturing an optical recording/reproduction medium, to manufacture the optical recording/reproduction medium on which pits corresponding to recording data are formed along recording tracks, wherein pit patterns corresponding to pits are provided, auxiliary pit patterns are formed in at least a portion of the spaces between adjacent pit patterns along the recording track direction, if the depth of pit patterns is d'1 and the depth of auxiliary pit patterns is d'2, then d'1≧d'2, and both edges of the auxiliary pit patterns along the recording track direction are formed as simple convex curves.

Further, the present invention is the stamper having the above-described configuration, wherein when with respect to the optical recording and reproduction medium the refractive index of the medium from the light entering surface to a pit is n, the wavelength of the incident light used for reproducing the recorded information of pits is λ, the pit pattern phase depth is x'1, and the auxiliary pit pattern phase depth is x'2, then $$\lambda/13.06n \leq x'1 \leq \lambda/5.84n \quad (3)$$

$$\lambda/16.14n \leq x'2 \leq x'1 \quad (4)$$

Further, the present invention is the stamper having the above-described configuration, wherein the wavelength λ of incident light for reproduction is 405±10 nm, and the numerical aperture NA of the objective lens is 0.85±0.05.

Further, the present invention is the stamper having the above-described configuration, wherein a track pitch of the pit is greater than or equal to ⅘ of, but less than ½ of, the cutoff frequency of the track pitch corresponding to the wavelength λ of the incident light for reproduction and corresponding to the numerical aperture NA of the objective lens.

Further, the present invention is the stumper in each of the above-described configurations, wherein when the spaces between pit patterns are the shortest spaces as determined by the modulation method of pit recording information, auxiliary pit patterns are not provided.

Further, the present invention is the stumper in each of the above-described configurations, wherein groove patterns corresponding to grooves of the optical recording/reproduction medium are formed intermixed with pit patterns.

Further, the present invention is the stumper in each of the above-described configurations, wherein the track pitch of pit patterns and the track pitch of groove patterns are the same.

Further, the present invention is the stumper in each of the above-described configurations, wherein the modulation method for pit patterns and the modulation method for recording information recorded in grooves, are the same.

Furthermore, the present invention is an optical recording/reproducing device using the optical recording/reproduction medium having each of the above-described configurations.

That is, the optical recording/reproducing device includes an optical recording/reproduction medium on which pits corresponding to recording information are formed along recording tracks, in which auxiliary pits are formed in at least a portion of the spaces between adjacent pits along the recording track direction, such that when the pit depth is d1 and the auxiliary pit depth is d2, then d1≧d2, and both edges of the auxiliary pits along the recording track direction are shaped as simple convex curves.

Further, the present invention is the optical recording/reproducing device using the optical recording/reproduction medium having the above-described configuration, wherein when with respect to optical recording/reproduction medium the refractive index of the medium from the light entering surface to a pit is n, the wavelength of the incident light used for reproducing the recorded information of pits is λ, the pit phase depth is x1, and the auxiliary pit phase depth is x2, then the optical recording/reproduction medium which is formed such that the above eqs. (1) and (2) are satisfied is used.

Further, the present invention is the optical recording/reproducing device using the optical recording/reproduction medium having the above-described configurations, wherein the wavelength λ of incident light for reproduction is 405±10 nm, and the numerical aperture NA of the objective lens is 0.85±0.05.

Further, the present invention is the optical recording/reproducing device using the optical recording/reproduction medium having the above-described configuration, wherein a track pitch of a pit is greater than or equal to ⅘ of, but less than ½ of, the track pitch of a cutoff frequency corresponding to the wavelength λ of the incident light for reproduction and corresponding to the numerical aperture NA of the objective lens.

Further, the present invention is the optical recording/reproducing device using the optical recording/reproduction medium having each of the above-described configurations, wherein when the spaces between pits on the optical recording/reproduction medium are the shortest spaces as determined by the modulation method of recording information, auxiliary pits are not provided.

Further, the present invention is the optical recording/reproducing device using the optical recording/reproduction medium having each of the above-described configurations, wherein grooves are formed intermixed with pits.

Further, the present invention is the optical recording/reproducing device using the optical recording/reproduction medium having the above-described configuration, wherein the track pitch of pits and the track pitch of grooves are the same.

Furthermore, the present invention is the optical recording/reproducing device using the optical recording/reproduction medium having each of the above-described configurations, wherein a modulation method of the pit and the modulation method for recording information recorded in grooves are the same.

As described above, according to the present invention, since auxiliary pits are formed in at least a portion of the spaces between adjacent pits along the recording track direction, with a depth equal to or less than the pit depth, and with both edges of the auxiliary pits along the recording track direction shaped as simple convex curves, the pit density, that is, the pit duty in the recording track direction, that is, in the circumferential direction of a disc-shaped medium can be increased to more than 50%, and the push-pull signal amplitude can be increased.

In this specification, it is noted that the pit "depth" refers to the stepped height of a protrusion/depression pattern which forms pits, and when a pit is a depression portion, the pit depth indicates the depth thereof, and when a pit is formed as a protrusion portion, the pit depth indicates the height thereof.

Thus in the present invention, since auxiliary pits with a simple shape at both edge portions, that is in a simple shape not containing straight-line portions or concave portions is not formed between pits based on the conventional modulation method, which in this case is in a direction traversing the recording track, but is formed in the spaces between adjacent pits along the recording track direction, to a depth equal to or less than the depth of normal pits, the average pit duty can be improved, decrease in the push-pull signal amplitude can be suppressed, and stable tracking servo control can be performed.

In particular, when the depth of the auxiliary pits is set within the range indicated by the above formulas (1) and (2) expressed as a phase depth as described above, as is explained in detail in the following embodiments, the push-pull signal amplitude can be made sufficiently large, stable tracking servo control can be performed, and satisfactory recording/reproduction characteristics can be obtained.

Particularly when the wavelength λ of incident light for reproduction is 405±10 nm and the numerical aperture NA of the objective lens is 0.85±0.05, for example, in Blu-ray Discs and similar high-density optical recording/reproduction media, by providing auxiliary pits in each of the above-described configurations, pit signals can be reproduced with stability.

Similarly, even if the pit track pitch is set equal to or greater than ⅔ of, but less than ½ of, the track pitch corresponding to the cutoff frequency, stable pit signal reproduction can be performed.

At this time, degree of modulation of the pit decreases, but by employing a configuration in which auxiliary pits are not provided in the portions in which the spaces between pits are shortest, lowering of the degree of modulation of the shortest pits can be avoided, and the decrease in degree of modulation of other pits also can be held to a level which poses no practical problems.

Also, even when grooves and pits are intermixed, it is possible to stably reproduce groove signals as well as pit signals.

Furthermore, even when the groove track pitch is reduced to be equal to or greater than ⅔ of, but less than ½ of, the track pitch of the cutoff frequency in order to increase the density, according to the present invention as described above, pit signals can be stably reproduced; hence the same track pitch can be used for pits and grooves, and the same modulation method can be used for pits and grooves, so that inconveniences such as the use of a separate format solely for pit portions can be avoided.

BEST MODE FOR CARRYING OUT THE INVENTION

Figure 1:
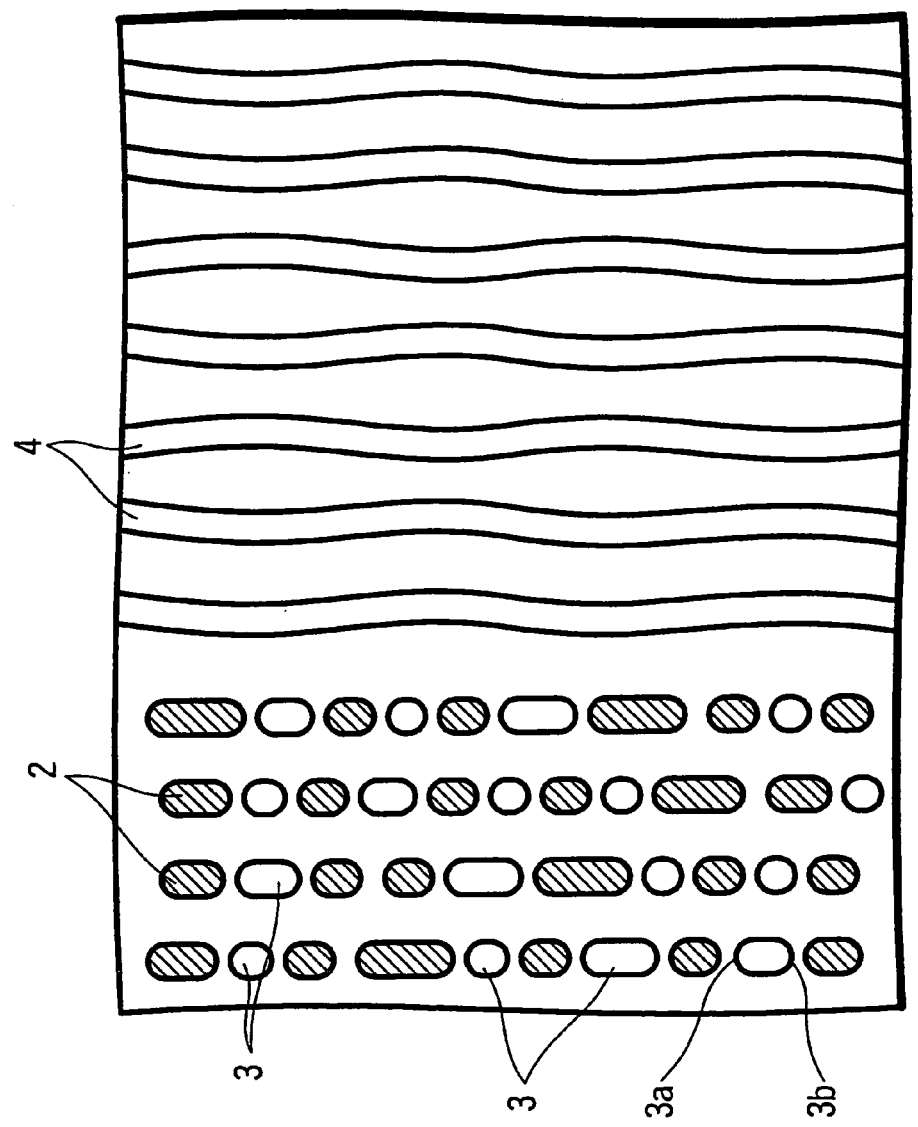
FIG. 1 is a view explaining one example of an optical recording/reproduction medium.

Hereinafter, embodiments of the present invention is explained in detail, referring to the drawings; however, this invention is not limited to the following examples, and various modifications can be adopted without deviating from the gist of the configuration of this invention.

In the following embodiments, as schematically shown in plane view of FIG. 1 with an enlarged portion thereof, pits 2 corresponding to recording information are formed along the recording track, and auxiliary pits 3 are formed in at least a portion of the spaces between adjacent pits in recording track direction, that is, in the case of a disc-shaped optical recording/reproduction medium, in the circumferential direction. In FIG. 1, the pits 2 are indicated by shading.

When the pit depth is d1 and the auxiliary pit depth is d2, then a configuration is employed in which d1≧d2. Also, both edges 3a and 3b of the auxiliary pits along the recording track direction are shaped as simple convex curves.

FIG. 1 shows an embodiment in which grooves 4 are provided together with pits 2, and the portion where pits are formed and the portion where grooves are formed are provided in separate areas. A state is shown in which wobbling information is recorded in the grooves 4.

In the above configuration of this embodiment, when with respect to the optical recording/reproduction medium the refractive index of the medium from the light entering surface to a pit is n, the wavelength of the incident light used for reproducing the recorded information of pits is λ, the pit phase depth is x1, and the auxiliary pit phase depth is x2, then $$\lambda/13.06n \leq x1 \leq \lambda/5.84n \quad (1)$$

$$\lambda/16.14n \leq x2 \leq x1 \quad (2)$$

Figure 2:
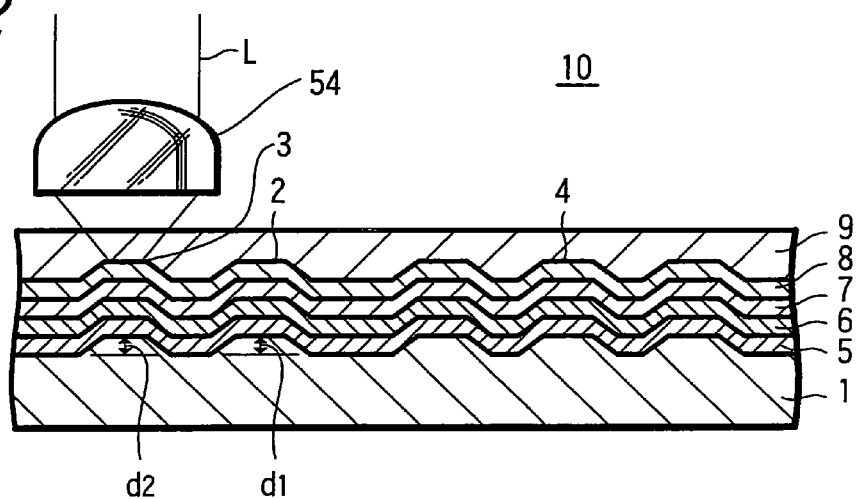
FIG. 2 is an enlarged linear cross-sectional view of one example of an optical recording/reproduction medium.

Specifically, as shown in FIG. 2 with the schematic cross-sectional view of one example, on the side nearer the light entering surface on the substrate 1, that is, on the upper side in the example shown in the figure, protruding convex-shaped pits 2, auxiliary pits 3, and grooves 4 are formed, and on these, for example, a reflective layer 5, first dielectric layer 6, recording layer 7, second dielectric layer 8, and optically transmitting protective layer 9 are sequentially laminated to form the optical recording/reproduction medium 10.

Numeral 54 denotes an objective lens or other optical pickup; laser light or other incident light L for reproduction irradiates the auxiliary pits 3. In this case, the protective layer 9 is the medium provided from the above-described light entering surface to the pits, and the refractive index thereof is n and the wavelength of the incident light for reproduction is λ, then the above eqs. (1) and (2) are applied.

The example shown in FIG. 2 is a case where pit portions are formed as protrusion patterns on the substrate 1, and here the height of the pits 2 is d1 and the height of the auxiliary pits 3 is d2, in which the pits 2 and auxiliary pits 3 are formed with the heights d1 and d2 approximately equal.

The height of the auxiliary pits 3 is not limited to this example and may be made lower (that is, shallower) than the height of pits 2 in other cases; however heights are selected within the range satisfying the above-described eqs. (1) and (2). When the height (depth) of auxiliary pits 3 is selected as described above, satisfactory recording/reproduction characteristics can be secured, as explained in detail in subsequent embodiments.

FIG. 1 shows a case in which, when the space between pits 2 is the shortest space as determined by the modulation method of the recording information, auxiliary pits are not provided; portions between pits 2, in which auxiliary pits are not formed, are shown to be 2T space portions, when pits 2 are used to record recording information by, for example, the 1-7 modulation method.

Figure 3A:
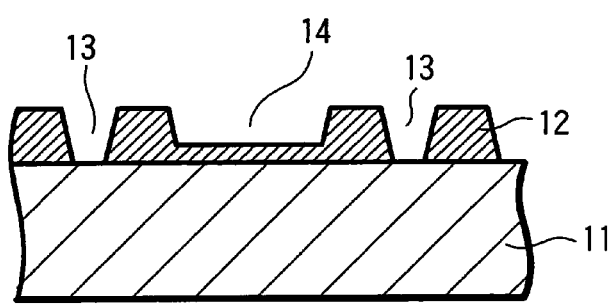
FIGS. 3A, 3B and 3C are views showing an example of manufacturing processes for a stamper used to manufacture an optical recording/reproduction medium.
Figure 3B:
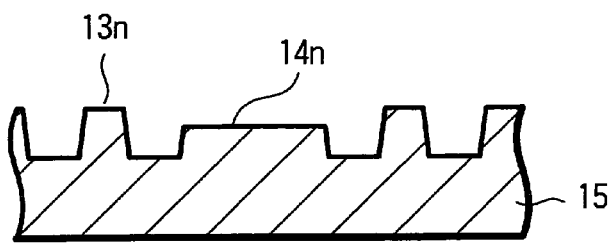
Figure 3C:
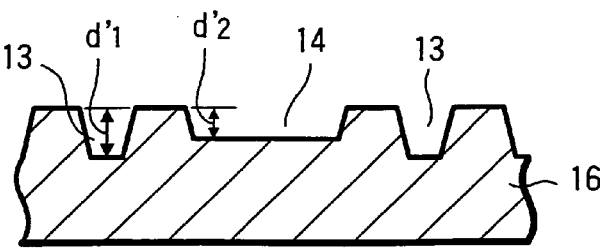

Next, an example of processes to manufacture such optical recording/reproduction medium is explained, referring to FIGS. 3A to 3C showing the manufacturing processes thereof.

In FIG. 3A, numeral 11 denotes a substrate for a master, formed of glass or similar. A photosensing layer 12 consisting of photoresist or similar is formed on the surface of this master substrate 11, and by exposing and developing a predetermined pattern using an optical recording device described later on, as well as pit patterns 13 that is a pattern corresponding to the recording information, auxiliary pit patterns 14 that is formed between these pit patterns 13, are formed as depression patterns in the photosensing layer 12 so as to be, in this case, shallow compared to the pit patterns 13. At that time, the auxiliary pit patterns 14 are formed by exposing the pattern by scanning a single exposure light spot similarly to the case of the pit patterns 13, such that of the planar shape both edge portions along the recording track are simple convex curves.

Thereafter, though not shown in the figure, by covering the entire surface of this patterned photosensing layer 12 with a conductive film consisting of nickel film or similar using an electroless plating or other method, and then by mounting the master substrate 11 covered with the conductive film in an electroforming device, a nickel plating layer of thickness approximately 300±5 μm, for example, is formed by electroplating on the conductive film layer.

Subsequently, a cutter or similar is used to strip the nickel plating layer from the master substrate 11 on which a thick nickel plating layer is deposited, and the photosensing layer on which is formed a depression/protrusion pattern is washed with acetone or similar; as shown in FIG. 3B, a stamper 15, that is a so-called master stamper, is formed in which the pit pattern 13 and auxiliary pit pattern 14 on the master 11 are inverted to form the inverted pit pattern 13$n$ and inverted auxiliary pit pattern 14$n$.

Thereafter, after applying, for example, a mold releasing agent to the surface on which is formed the depression/protrusion pattern of the stamper 15, a method such as electroplating is used to form the mother stamper 16 onto which is transferred the depression/protrusion pattern of the stamper 15, as shown in FIG. 3C.

Similarly to the pattern of the photosensing layer 12 on the master substrate 11 explained in FIG. 3A, the predetermined pit pattern 13 and auxiliary pit pattern 14 are formed as depressions on this mother stamper 16.

The depths (heights) of the pit patterns and auxiliary pit patterns formed on the stamper 15 and the mother stamper 16 are selected similarly to the case of the above-described optical recording/reproduction medium.

That is, as shown in one example in FIG. 3C, when the depth of the pit pattern 13 is d'1 and the depth of the auxiliary pit pattern 14 is d'2, d'1≧d'2. The example of FIG. 3C shows a case in which d'1>d'2.

Further, a configuration is employed in which, when the refractive index of the medium from the light entering surface to a pit in the optical recording/reproduction medium is n, the wavelength of incident light for reproduction used to reproduce the information recorded by pits is λ, the phase depth of the pit pattern 13 is x'1, and the phase depth of the auxiliary pit pattern 14 is x'2, then:

$$\lambda/13.06n \leq X'1 \leq \lambda/5.84n$$

$$\lambda/16.14n \leq X'2 \leq X'1$$

Next, specific manufacturing processes for the photosensing layer 12 on the master 11, explained in the above FIG. 3A, are explained in detail, together with an example of configuration of an optical recording device.

First, the configuration of the optical recording device is explained.

In the above-described pattern exposure process, a method is conventionally adopted in which the laser beam is condensed by an objective lens to expose the photoresist on the master substrate. An example of such an optical recording device is shown in FIG. 4.

Figure 4:
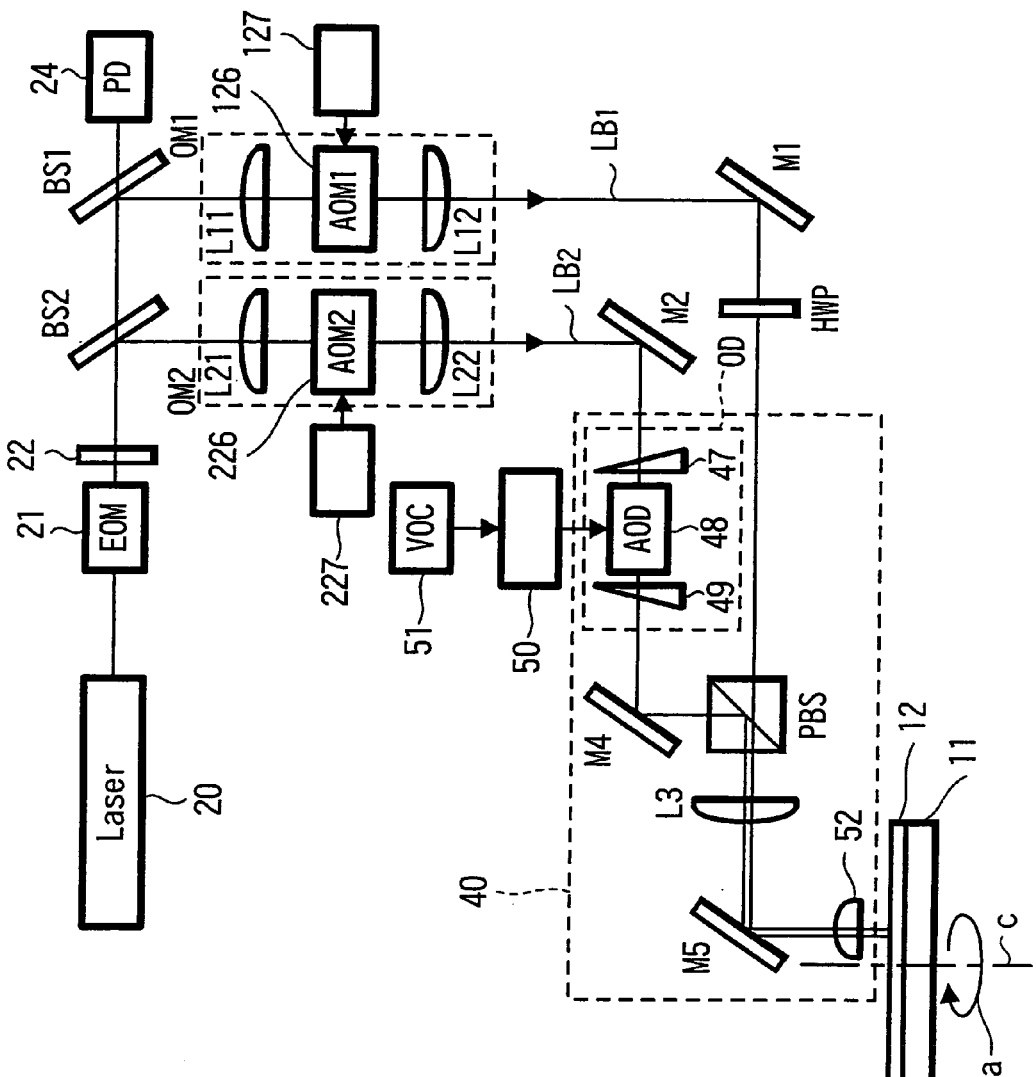
FIG. 4 is a block diagram showing the configuration of an example of an optical recording/reproducing device.

In FIG. 4, numeral 20 indicates a gas laser or other light source. There are no limitations in particular on the light source, and an appropriate light source can be selected for use; in this example, a laser source is employed in which the laser light for recording is emitted by a Kr laser (wavelength λ=351 nm).

After laser light emitted from the light source 20 passes through an electro-optical modulator (EOM) 21 and an analyzer 22, it is partially reflected by a beam splitter BS2 and a beam splitter BS1. Laser light passing through both the beam splitters BS2 and BS1 is detected by a photodetector (PD) 24, and is compared with a comparison voltage in a recording optical power control circuit or other control portion, though not shown in the figure, and the result is fed back to the modulator 21.

The laser light beams LB1 and LB2 reflected by the beam splitters BS1 and BS2 respectively are guided to the respective modulation optical systems OM1 and OM2. In the modulation optical system OM1, the laser light is condensed by a lens L11, and an AO modulator 126 comprising an AOM1 (acousto-optic modulator) is positioned in the focal plane of the beam.

Ultrasound corresponding to the recording signal is input from a driver 127 to this AO modulator 126, and the intensity of the laser light is modulated on the basis of this ultrasound. The laser light is diffracted by the diffraction grating of the AO modulator 126, and the system is configured such that of this diffracted light, only first-order diffracted light passes through the slit.

After being intensity-modulated, the first-order diffracted light is condensed by a lens L12 and is then reflected by a mirror M1 such that its direction of propagation is bent 90°, before passing through a λ/2 wave plate HWP and being guided, horizontally with respect to a mobile optical table 40 and along the optical axis, to be incident on a polarizing beam splitter PBS.

Similarly, in the modulation optical system OM2, the laser light is condensed by a lens L21 and is incident on an AO modulator 226 comprising an AOM2 positioned in the focal plane; the laser light is intensity-modulated based on ultrasound corresponding to the recording signal input from a driver 227. After similarly condensing divergent laser light by a lens L22, it is reflected by a mirror M2 so that the direction of propagation is bent 90°, and is guided horizontally with respect to the mobile optical table 40 and along the optical axis.

When a groove is formed by the laser light LB2, and when this groove is a wobble groove, after optical deflection is performed by a deflecting optical system OD on the mobile optical table 40, the beam is reflected by a mirror M4 so that the direction of propagation is again bent 90°, and the beam is incident on the polarizing beam splitter PBS.

The laser light LB1 passing through the polarizing beam splitter PBS, as well as the laser light LB2 the propagation direction of which is again bent 90° by the polarizing beam splitter PBS, pass through a magnifying lens L3 such that the beam diameter is made to be a predetermined value, and are then reflected by a mirror M5 and guided to an objective lens 52, and are focused on the photosensing layer 12 on the master substrate 11 by the objective lens 52. The master substrate 11 is rotated in the direction indicated by an arrow a by rotational driving means, not shown in the figure. The dot-dash line c indicates the center axis of the substrate 11.

The laser light LB1 and LB2 for recording is moved in parallel by the mobile optical table 40. By this means, the latent image corresponding to the depression/protrusion pattern resulting from the irradiation trace of the laser light is formed across the surface of the photosensing layer 12.

Here, the deflection optical system OD comprises a wedge prism 47, acousto-optical deflector (AOD) 48, and wedge prism 49. The laser light LB2 is incident on the acousto-optical deflector 48 via the wedge prism 47, and is optically deflected by the acousto-optical deflector 48 according to the desired exposure pattern.

As the acousto-optical element used in this acousto-optical deflector 48, for example, an acousto-optical element of tellurium oxide ($TeO_2$) is appropriate. The laser light LB2 subjected to optical deflection by the acousto-optical deflector 48 passes through the wedge prism 49 and is emitted from the deflection optical system OD.

The wedge prisms 47, 49 have functions which cause the laser light LB2 to be incident such that the Bragg condition for the grating surface of the acousto-optical element of the acousto-optical deflector 48 is satisfied, while also ensuring that the horizontal height of the beam does not change even upon optical deflection of the laser light LB2 by the acousto-optical deflector 48. In other words, these wedge prisms 47, 49 and the acousto-optical deflector 48 are positioned such that the grating surface of the acousto-optical element of the acousto-optical deflector 48 satisfies the Bragg condition for the laser light LB2, and such that the horizontal height of the laser light emitted from the deflection optical system OD does not change.

Further, a driver 50 in order to drive the acousto-optical deflector 48 is mounted on the acousto-optical deflector 48; a high-frequency signal modulated by a sine wave is supplied to this driver 50 from a voltage controlled oscillator (VCO) 51. During exposure of the photosensing layer, a signal corresponding to the desired exposure pattern is input from the voltage controlled oscillator 51 to the driver 50 for driving, and the acousto-optical deflector 48 is driven by the driver 50 according to this signal; accordingly, the laser light LB2 is subjected to optical deflection corresponding to the desired wobbling.

Specifically, when address information is added to grooves by, for example, causing grooves to wobble at a frequency of 194.1 kHz, a high-frequency signal with center frequency of for example 224 MHz is modulated to a control signal of frequency 194.1 kHz, and is supplied by a sine-wave from the voltage controlled oscillator 51 to the driver 50 for driving.

The acousto-optical deflector 48 is driven by the driver 50 in response to this signal, and the Bragg angle of the acousto-optical element of the acousto-optical deflector 48 is changed; accordingly, the laser light is subjected to optical deflection so as to correspond to wobbling at a frequency of 194.1 kHz. By this means, the spot position of the laser light focused on the photosensing layer is optically deflected so as to vibrate in the radial direction of the master substrate 11 at a frequency of 194.1 kHz and amplitude ±9 nm.

Here the polarizing beam splitter PBS is configured so as to reflect S-polarized light and transmit P-polarized light; the optically deflected laser light LB2 is S-polarized light, and is reflected by the PBS.

Laser light LB1 emitted from the first modulation optical system OM1 is passed through a λ/2 wave plate HWP so as to rotate the polarization direction 90° and so becomes P-polarized light, and is transmitted by the PBS.

In the following embodiment, the numerical aperture NA of the objective lens was set to 0.9. Tellurium oxide was used as the acousto-optical elements of the acousto-optical modulators 126 and 226. Signals supplied from the input terminal via the drivers 127 and 227 are, when forming pits, 1-7 modulated signals with signals for auxiliary pits added in spaces, and when forming grooves, are fixed-level DC (direct current) signals.

In this embodiment, as the optical lenses of the modulation optical systems OM1 and OM2, the condensing lenses L11 and L21 have a focal length of 80 mm, the collimating lenses L12 and L22 have a focal length of 100 mm, and the magnifying lens L3 of the mobile optical table 4 has a focal length of 50 mm.

As the exposure conditions of an optical recording device with the above-described configuration, the laser power for wobble grooves is 0.30 mJ/m, the laser power for pits is approximately 0.25 mJ/m, and the photosensing layer 12 on the master substrate 11 was subjected to pattern exposure, using the first modulation optical system OM1 for the above-described auxiliary pits using signals with 1-7 modulation and using the second modulation optical system OM2 for the DC modulation signal with a track pitch of 0.32 μm.

Figures 5A, 5B:
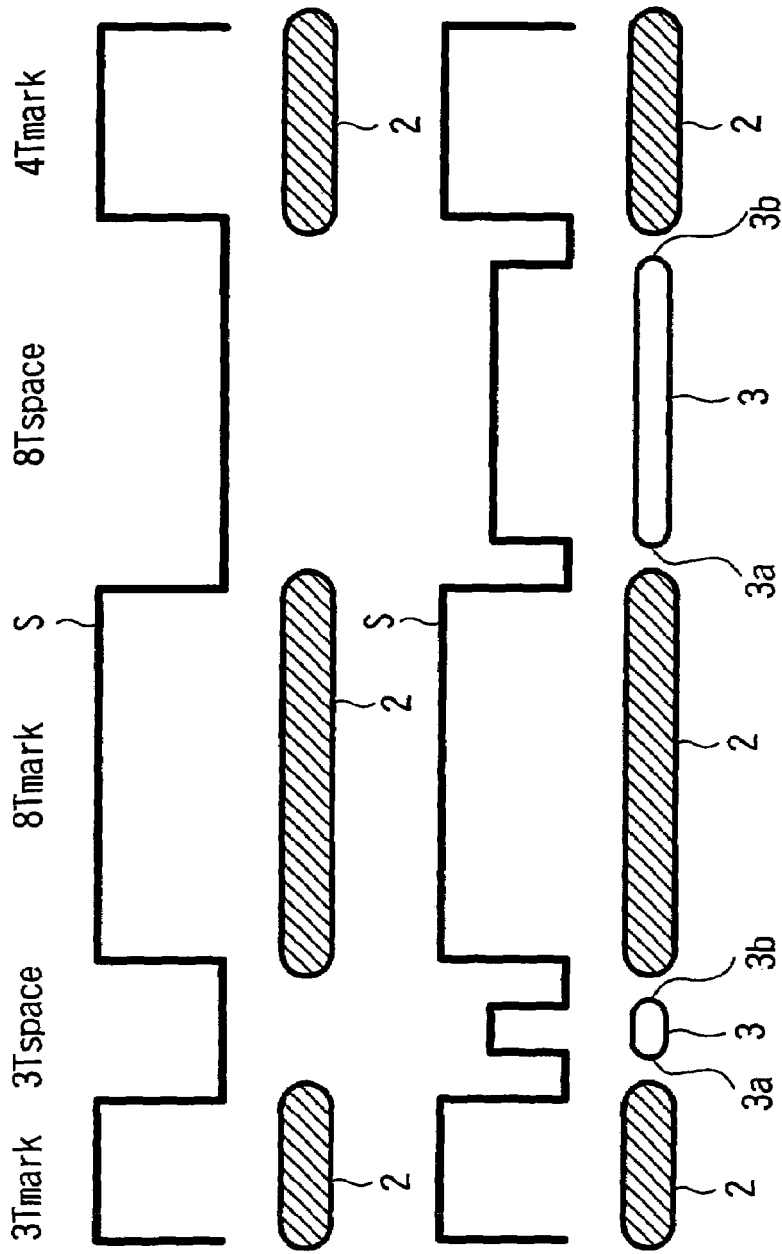
FIGS. 5A and 5B are views explaining pit signals in a 1-7 modulation method.

As schematically shown in FIG. 5A by the pits 2 and the corresponding signals S, conventionally in the case of 1-7 modulation the density in the circumferential direction of the pits 2, that is, the pit duty, is 50%. The push-pull signal amplitude is proportional to the pit duty. That is, in the case where the pit edge position for a pit duty is of 50%, the push-pull signal amplitude is reduced to 50% of that for grooves.

However, in this embodiment, as shown in FIG. 5B, by forming auxiliary pits 3 in the spaces between pits 2, the average pit duty can be increased beyond 50%, so that the push-pull signal amplitude is increased and stable tracking servo control can be obtained. In FIGS. 5A and 5B, pits 2 are shaded.

Both edge portions 3a and 3b along the recording track of the auxiliary pits 3 are formed to describe simple convex curves through exposure by the laser light 1, as described above.

In the embodiment shown in FIGS. 5A and 5B, 3T spaces and 8T spaces are shown as spaces between pits; such a configuration may also be employed as that in which auxiliary pits 3 are not provided in 2T spaces, which are the shortest spaces in 1-7 modulation.

After performing the above-described pattern exposure, the master substrate 11 is placed on the turntable of a developer such that the photosensing layer 12 is upward, and the surface of the master substrate 11 is rotated so as to be in the horizontal plane. In this state, developer fluid is dripped onto the photosensing layer 12, and development of the photosensing layer 12 is performed; in the signal formation region a depression/protrusion pattern is formed based on the recording signal, and a master for manufacturing an optical recording/reproduction medium, explained in the above-described FIG. 3A, is formed.

Thereafter, the manufacturing processes explained in the above-described FIGS. 3B and 3C are used to form a stamper for manufacturing an optical recording/reproduction medium (in this case, simply called a mother stamper), in which the formed depression/protrusion pattern is the inversion of the depression/protrusion pattern fabricated by the pattern exposure and development processes using the above-described optical recording device. Further, a substrate for an optical recording/reproduction medium of polycarbonate or another light transmissive resin is formed by injection molding, the 2P method, or another method from this mother stamper; in this example, injection molding is used.

In this embodiment, the thickness of the molded substrate is set to 1.1 mm, and by sputtering or other means a reflective layer 5, of an Al alloy or similar; a first dielectric layer 6, of ZnS—SiO$_2$ or similar; a recording layer 7 comprising phase-changing material, of GeSbTe alloy or similar; and a second dielectric layer 8, of ZnS—SiO$_2$ or similar are sequentially formed on the signal formation surface. Then, the spin-coating method is used to apply an ultraviolet-curing resin onto the second dielectric layer 5, and by irradiating this ultraviolet-curing resin with ultraviolet radiation to cause hardening, a protective layer 9 of thickness 0.1 mm is formed.

By means of such manufacturing processes, optical recording/reproduction media as explained in FIGS. 1 and 2, such as, for example, a medium in the Blu-ray Disc format, in which are formed 1-7 modulation signal pits with auxiliary pits and wobbling grooves using the configuration of this invention, can be fabricated.

Evaluations of the reproduction characteristics of the depression/protrusion pattern of the optical recording/reproduction medium formed as described above were performed using an optical recording/reproducing device comprising an optical system with a wavelength λ=406 nm and numerical aperture NA=0.85. A schematic view of this device is shown in FIG. 6.

Figure 6:
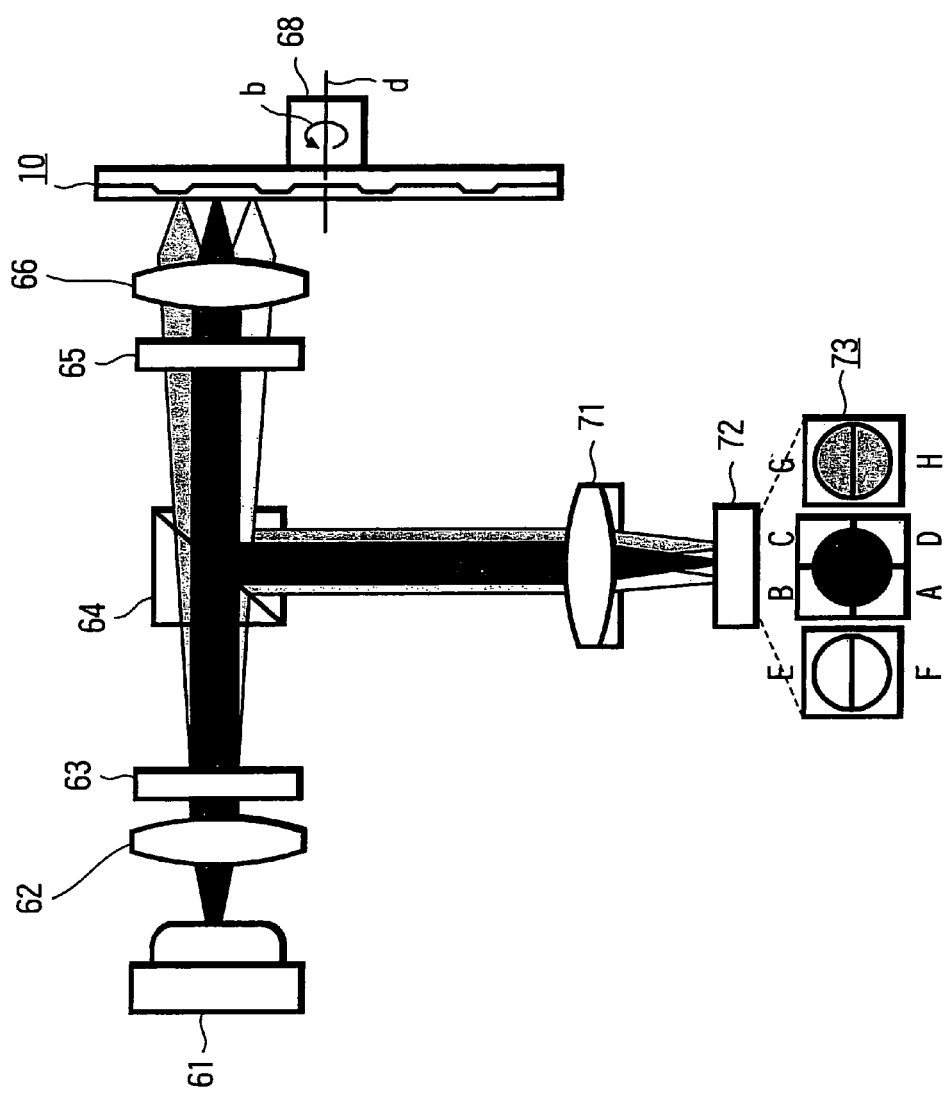
FIG. 6 is a diagram showing the configuration of an example of an optical recording/reproducing device; and, FIG. 7 is a view explaining an example of a conventional optical recording/reproduction medium.

In FIG. 6, numeral 61 indicates a semiconductor laser or other light source with wavelength λ=406 nm; the laser beam emitted therefrom is rendered into a parallel beam by a collimating lens 62, and is divided by a grating 63 into three beams, the 0th order (main) beam, and the ±1st order (sub-) beams. These three beams (P-polarized light) pass through a polarizing beam splitter 64 and ¼-wave plate 65 as circularly polarized light, and are focused on a predetermined recording track of the optical recording/reproduction medium 10 by an optical pickup 66 having an objective lens with a numerical aperture NA=0.85. The center spot of the main beam is used to reproduce recorded information; the sub-beam light spots are used for detecting a tracking error. Numeral 68 indicates rotation means which rotates the optical recording/reproduction medium 10 as indicated by the arrow b. The solid line d indicates the axis of rotation of the optical recording/reproduction medium 10.

Light reflected from the optical recording/reproduction medium 10 passes again through the optical pickup 66 and ¼-wave plate 65, and the circularly polarized light becomes S-polarized light to be reflected by the polarizing beam splitter 64, and is incident on a combination lens 71.

Laser light incident on the combination lens 71 passing through a lens which imparts astigmatic aberration to the laser beam, enters a photodiode 72 and is converted into an electrical signal according to the beam intensity, and is then output to a servo circuit as a servo signal (focusing error signal and tracking error signal). The photodiode 72 has divided detectors 73 (A through H). Return light from the main beam is incident on the four divided detectors A through D positioned in the center of the detector 73; return light from the sub-beams is incident on those of E through H, positioned on both sides of the detector 73.

The signals A through H output from the detectors 73 A through H are, as indicated below, subjected to addition and subtraction processing by a predetermined circuit system, though not shown in the figure, and a predetermined signal is output. In this example, a differential push-pull (DPP) method using three laser light beams positioned at predetermined intervals to irradiate the medium are employed to obtain a tracking servo signal. That is, reproduction signal of optical recording/reproduction medium=$(A+B+C+D)$ pit reproduction signal (for example, EFM signal)=$(A+B+C+D)$ push-pull signal=$(B+C)-(A+D)$ differential push-pull (tracking servo) signal=$(B+C)-(A+D)-k((E-F)+(G-H))$ (where k is a predetermined constant).

In the following embodiment, an optical recording/reproducing device with the above-described configuration was employed to perform evaluations of the optical recording/reproduction medium with the above-described configuration of this invention.

EMBODIMENT

Next, evaluations of the depression/protrusion pattern reproduction characteristics were performed for the optical recording/reproduction medium having the above-described configuration of this invention, and, as a comparative example, for an optical recording/reproduction medium without auxiliary pits provided, using an optical recording/reproducing device comprising the optical system described in FIG. 6 above, with wavelength λ=406 nm and numerical aperture NA=0.85. As explained above, the track pitch was set to 0.32 μm.

In the modulation optical system OM1 of the optical recording device as explained above using FIG. 4, the exposure power was adjusted for pits and for auxiliary pits, and examples of respective optical recording/reproduction media were manufactured having pits and auxiliary pits with different depths.

Discs A through E were fabricated, with pit depths of 47 nm, 39 nm, 34 nm, 23 nm, and 21 nm respectively; regions were formed on each disc in which the depths of auxiliary pits were varied from 0 nm up to a depth equivalent to the pit depth. The phase depths corresponding to the pit depth and auxiliary pit depth in each example, and the amplitudes of the push-pull signals obtained from each example of optical recording/reproduction media, are as indicated in Table 1 below. The refractive index n used when calculating the phase depths was 1.48 (the refractive index of the material of the protective layer 9 shown in the above FIG. 2), and the wavelength of incident light for reproduction was, as described above, 406 nm. The depths of auxiliary pits cannot be made greater than the thickness of the photosensing layer explained in the above FIG. 3A, and so these are omitted from Table 1 below.

TABLE 1

| Auxiliary pit depth [nm] | Auxiliary pit phase depth $\lambda/d \cdot n$ | Disc A pit depth 47 [nm] Pit phase depth $\lambda/d \cdot n$ 5.84 | Disc B pit depth 39 [nm] Pit phase depth $\lambda/d \cdot n$ 7.03 | Disc C pit depth 34 [nm] Pit phase depth $\lambda/d \cdot n$ 8.07 | Disc D pit depth 23 [nm] Pit phase depth $\lambda/d \cdot n$ 11.93 | Disc E pit depth 21 [nm] Pit phase depth $\lambda/d \cdot n$ 13.06 |
|---|---|---|---|---|---|---|
| 0 (none) |  | 0.124 | 0.128 | 0.130 | 0.110 | 0.102 |
| 17 | 16.14 | 0.146 | 0.156 | 0.156 | 0.140 | 0.135 |
| 21 | 13.06 | 0.150 | 0.162 | 0.160 | 0.146 | 0.146 |
| 23 | 11.93 | 0.154 | 0.168 | 0.164 | 0.150 |  |
| 34 | 8.07 | 0.166 | 0.172 | 0.176 |  |  |
| 39 | 7.03 | 0.168 | 0.176 |  |  |  |
| 47 | 5.84 | 0.166 |  |  |  |  |

Figure 7:
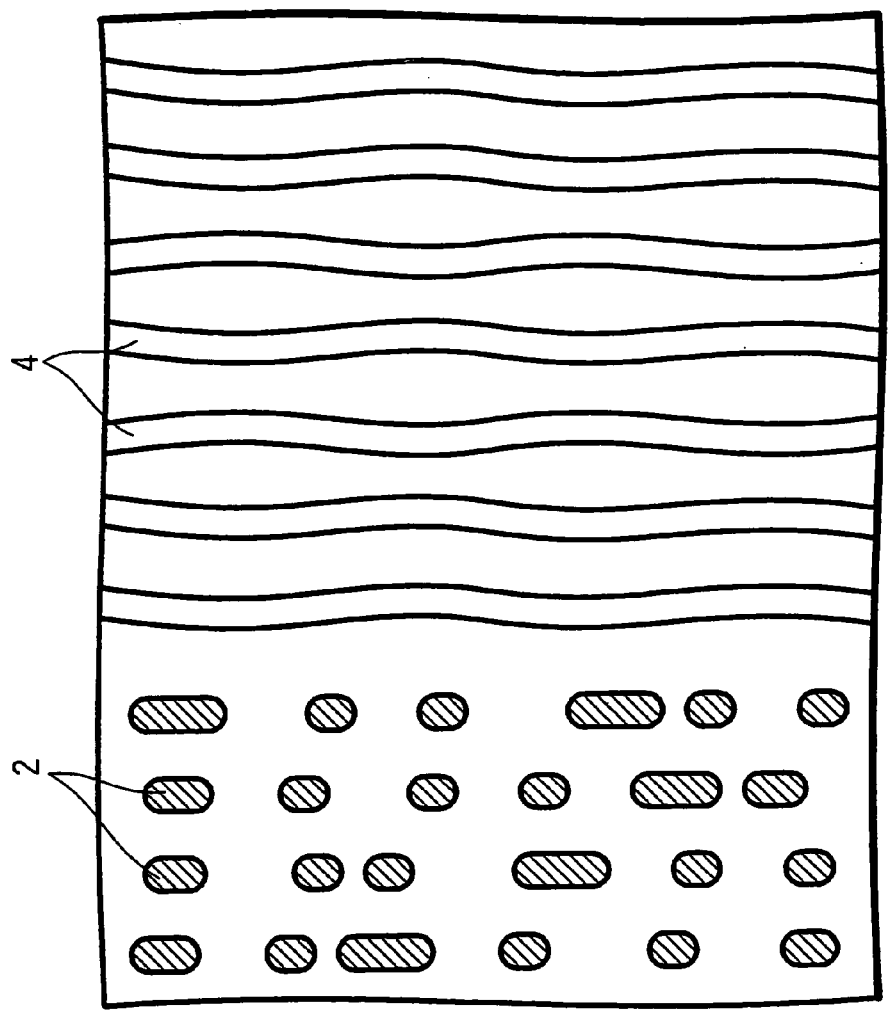

In an optical recording/reproduction medium having conventional 1-7 modulation pits in which auxiliary pits are not provided, that is, in the optical recording/reproduction medium having conventional pits 2 and grooves 4 as shown by the schematic example of a plane pattern in FIG. 7, in each case where the pit depth was varied, the push-pull signal amplitude was approximately 12%, so that stable tracking servo control was not possible and pit signals could not be reproduced.

However, in all regions where pits are formed on all optical recording/reproduction media having auxiliary pits of depth 17 nm or greater, the push-pull signal amplitude was approximately 15% or greater and stable tracking servo control could be obtained, so that pit signal reproduction was possible.

Here when the pit depth d1 was from 34 nm to 47 nm, the phase depth x1 was $\lambda/5.84n \leq x1 \leq \lambda/8.07n$.

When the auxiliary pit depth was 17 nm or greater up to the depth of the pits, and the phase depth x2 was as follows, satisfactory results were obtained:

$\lambda/16.14n \leq x2 \leq \lambda/5.84n$  (Disc A)

$\lambda/16.14n \leq x2 \leq \lambda/7.03n$  (Disc B)

$\lambda/16.14n \leq x2 \leq \lambda/8.07n$  (Disc C)

$\lambda/16.14n \leq x2 \leq \lambda/11.93n$  (Disc D)

$\lambda/16.14n \leq x2 \leq \lambda/13.06n$  (Disc E)

The upper limit of the phase depth of auxiliary pits was, as explained above, to the pit phase depth.

Further, as explained above, by employing a configuration in which auxiliary pits are not provided in the 2T spaces which are the shortest spaces when the 1-7 modulation method is adopted, the pit signal reproduction characteristics were improved and jitter was reduced by approximately 1%.

As explained above, the ROM track pitch of DVR-ROM and Blu-ray Discs is set to 0.32 µm, or approximately 4/3 of the cutoff frequency track pitch (0.239 µm; that is, 0.32/0.239=1.339), and an adequate tracking servo signal amplitude (push-pull signal amplitude) cannot be obtained. Thus, according to the present invention, even in the case of a pit format with a narrow track pitch, by providing auxiliary pits in spaces between pits excluding the 2T spaces of the 1-7 modulation method, by selecting the phase depth of pits equal to or greater than $\lambda/13.06n$ and equal to or less than $\lambda/5.84n$, and by selecting the phase depth of auxiliary pits equal to or greater than $\lambda/16.14n$ and equal to or less than the phase depth of pits, satisfactory pit signal reproduction characteristics could be obtained.

As described above, satisfactory reproduction characteristics for pit information signals can be retained even when auxiliary pits are provided, because with respect to pit signals which are comparatively long in the recording track direction, that is, for 3T to 8T signals in the 1-7 modulation method, adequate pit information reproduction characteristics are obtained; and sufficient pit reproduction output is obtained even if auxiliary pits are provided in the spaces between these pits, and by refraining from providing auxiliary pits only in the shortest spaces, it is understood that sufficiently favorable reproduction characteristics are retained. That is, even if auxiliary pits are provided, the degree of modulation for 3T and longer pits decreases somewhat, but there causes no problems for signal characteristics, and satisfactory reproduction characteristics can be obtained.

As explained above, control of the depth of auxiliary pits is executed by adjusting the intensity of the exposure laser on the photosensing layer of the master substrate. That is, when forming comparatively shallow auxiliary pits, the width is reduced to a narrow width compared with ordinary pit widths.

On the other hand, even if the depth of auxiliary pits is made approximately equal to the depth of ordinary pits, if the width alone can be reduced, then it is understood that a similar advantageous result can be obtained.

Further, in the embodiment explained in FIG. 1, a configuration can also be employed in which auxiliary pits are provided in the PIC (Permanent Information and Control Data) region of a Blu-ray Disc, that is, in a region conventionally specified similarly to the TOC. When Disc C in the above-described Table 1 was employed in this configuration, wobble groove address information could be reliably reproduced.

In each of the above-described discs, upon forming grooves with the same track pitch as for pits, and upon recording information in the groove portions using 1-7 modulation, reproduction was possible across the entire disc with the jitter level at 10% or less, and satisfactory recording/reproduction characteristics were obtained. Also, pits were formed with auxiliary pits added in the PIC region according to the configuration of this invention, and satisfactory pit signal reproduction characteristics were obtained.

In the above, aspects of this invention and various embodiments have been explained; however, of course this invention is not limited to the above-described embodiments, and within the gist of this invention various modifications can be employed such that, for example, the component materials of each of the layers of the phase-change material recording layer or similar can be modified, or various other changes, for example, employing a magneto-optical recording layer or a dye material layer, or other substrate materials and configurations can be made.

Further, the information is not limited to recording information; the present invention can be applied to an optical recording/reproduction medium, a stamper for the optical recording/reproduction medium, and an optical recording/reproducing device, each of which has functions for signal recording and reproduction, or for recording and reproduction of both information and signals.

As explained above, according to this invention, by providing auxiliary pits in between pits it is possible to avoid a reduction by half in the tracking servo signal amplitude (push-pull signal amplitude) in the pit portion, so that a sufficient tracking servo signal amplitude can be obtained even for an optical recording/reproduction medium with a narrow track pitch of approximately 0.32 µm as in DVR-ROM, Blu-ray Discs or similar with increased density, and satisfactory pit information recording/reproduction characteristics can be retained.

Further, a configuration in which auxiliary pits are provided in the spaces between ordinary pits can be formed when manufacturing an optical recording/reproduction medium, by a simple method in which auxiliary pit signals are added to the signals for pattern exposure of a photosensing layer without requiring complicated methods involving preparation of two different exposure light beams or similar, so that optical recording devices configured in the conventional manner can be used in manufacturing with excellent productivity, without requiring complicated operations when manufacturing.

Further, according to the present invention there can be provided: an optical recording/reproduction medium employing a format in which pits and grooves are intermixed, the pits and grooves are formed with the same track pitch, and the pit information or signals and the recording information recorded in grooves are recorded using the same modulation method; and an optical recording/reproducing device using the above medium.

The invention claimed is:

1. An optical recording and reproduction medium in which pits corresponding to recording information are formed along a recording track comprising:
   auxiliary pits formed in at least a portion of spaces between said pits which are adjacent along said recording track direction, wherein
   when the depth of said pits is d1 and the depth of said auxiliary pits is d2, the relation d1≧d2 is obtained;
   both edge portions of said auxiliary pits along said recording track are shaped as simple convex curves; and
   when a refractive index of a medium from a light entering surface on said optical recording and reproduction medium to said pits is n, a wavelength of incident light for reproduction used to reproduce the recording information of said pits is λ, a phase depth of said pits is x1, and a phase depth of said auxiliary pits is x2, then the relations $\lambda/13.06n \leq x1 \leq \lambda/5.84n$ and $\lambda/16.14n \leq x2 \leq x1$ are obtained.

2. The optical recording and reproduction medium according to claim 1; wherein the wavelength λ of said incident light for reproduction is 405±10 nm and a numerical aperture NA of an objective lens is 0.85±0.05.

3. The optical recording and reproduction medium according to claim 1, wherein a track pitch of said pits is equal to or greater than ⅘ of, but less than ½ of, a track pitch of a cutoff frequency corresponding to the wavelength λ of said incident light for reproduction and a numerical aperture NA of an objective lens.

4. The optical recording and reproduction medium according to claim 1, wherein when the spaces between said pits are the shortest spaces determined by a modulation method for said recording information, said auxiliary pits are not provided.

5. The optical recording and reproduction medium according to claim 1, wherein grooves are formed intermixed with said pits.

6. The optical recording and reproduction medium according to claim 5, wherein a track pitch of said pits and a track pitch of said grooves are the same.

7. The optical recording and reproduction medium according to claim 5, wherein a modulation method of said pits and the modulation method of recording information recorded in said grooves are the same.

8. A stamper for manufacturing an optical recording and reproduction medium, to manufacture the optical recording and reproduction medium in which pits corresponding to recording information are formed along a recording track comprising:
   pit patterns provided corresponding to said pits; and
   auxiliary pit patterns in at least a portion of spaces between adjacent pit patterns along said recording track direction, wherein
   when a depth of said pit pattern is d'1 and a depth of said auxiliary pit pattern is d'2, a relation d'1≦d'2 is obtained;
   both edge portions of said auxiliary pit patterns along said recording track are shaped as simple convex curves; and
   when a refractive index of a medium from a light entering surface on said optical recording and reproduction medium to said pits is n, a wavelength of incident light for reproduction used to reproduce the recording information of said pits is λ, a phase depth of said pit patterns is x'1, and a phase depth of said auxiliary pit patterns is x'2, then the relations $\lambda/13.06n < x'1 < \lambda/5.84n$ and $\lambda/16.14n < x'2 < x'1$ are obtained.

9. The stamper for manufacturing an optical recording and reproduction medium according to claim 8, wherein the wavelength λ of said incident light for reproduction is 405±10 nm and a numerical aperture NA of an objective lens is 0.85±0.05.

10. The stamper for manufacturing an optical recording and reproduction medium according to claim 8, wherein a track pitch of said pit patterns is equal to or greater than ⅘ of, but less than ½ of, a track pitch of a cutoff frequency corresponding to the wavelength λ of said incident light for reproduction and a numerical aperture NA of an objective lens.

11. The stamper for manufacturing an optical recording and reproduction medium according to claim 8, wherein when the spaces between said pit patterns are the shortest spaces determined by a modulation method for said recording information in said pits, said auxiliary pit patterns are not provided.

12. The stamper for manufacturing an optical recording and reproduction medium according to claim 8, wherein groove patterns corresponding to grooves in said optical recording and reproduction medium are formed intermixed with said pit patterns.

13. The stamper for manufacturing an optical recording and reproduction medium according to claim 12, wherein a track pitch of said pit patterns and a track pitch of said groove patterns are the same.

14. The stamper for manufacturing an optical recording and reproduction media according to claim 12, wherein a modulation method of said pit patterns and the modulation method of recording information recorded in said grooves are the same.

15. An optical recording and reproducing device, which uses an optical recording and reproduction medium in which pits corresponding to recording information are formed along a recording track, the optical recording and reproduction medium comprising:

auxiliary pits formed in at least a portion of spaces between said pits which are adjacent along said recording track direction, wherein when a depth of said pits is d1 and a depth of said auxiliary pits is d2, a relation d1≧d2 is obtained;

both edge portions of said auxiliary pits along said recording track are shaped as simple convex curves; and when a refractive index of a medium from a light entering surface on said optical recording and reproduction medium to said pits is n, a wavelength of incident light for reproduction used to reproduce the recording information of said pits is λ, a phase depth of said pits is x1, and a phase depth of said auxiliary pits is x2, then the relations $\lambda/13.06n < x1 < \lambda/5.84n$ and $\lambda/16.14n < x2 < x1$ are obtained.

16. The optical recording and reproducing device according to claim 15, wherein the wavelength λ of said incident light for reproduction is 405±10 nm and a numerical aperture NA of an objective lens is 0.85±0.05.

17. The optical recording and reproducing device according to claim 15, wherein a track pitch of said pits on said optical recording and reproduction medium is equal to or greater than ⅔ of, but less than ½ of, a track pitch of the cutoff frequency corresponding to the wavelength λ of said incident light for reproduction and a numerical aperture NA of an objective lens.

18. The optical recording and reproducing device according to claim 15, wherein when the spaces between said pits on said optical recording and reproduction medium are the shortest spaces determined by a modulation method for said recording information, said auxiliary pits are not provided.

19. The optical recording and reproducing device according to claim 15, wherein, on said optical recording and reproduction medium, grooves are formed intermixed with said pits.

20. The optical recording and reproducing device according to claim 19, wherein, on said optical recording and reproduction medium, a track pitch of said pits and a track pitch of said grooves are the same.

21. The optical recording and reproducing device according to claim 19, wherein, on said optical recording and reproduction medium, the modulation method of said pits and a modulation method of recording information recorded in said grooves are the same.

* * * * *

UNITED STATES PATENT AND TRADEMARK OFFICE
CERTIFICATE OF CORRECTION

PATENT NO. : 7,280,461 B2  Page 1 of 1
APPLICATION NO. : 10/491444
DATED : October 9, 2007
INVENTOR(S) : Sohmei Endoh It is certified that error appears in the above-identified patent and that said Letters Patent is hereby corrected as shown below:

Column 5, line 55, change "stumper" to --stamper--;
   line 60, change "stumper" to --stamper--;
   line 64, change "stumper" to --stamper--.

Column 6, line 1, change "stumper" to --stamper--.

Column 18, line 26, change "$d'1 \leq d'2$" to --$d'1 \geq d'2$--;
   line 38, change "$\lambda/13.06n < x1 < \lambda/5.84n$ and" to --$\lambda/13.06n \leq x1 \leq \lambda/5.84n$ and--
   line 40, change "$\lambda/16.14n < x2 < x1$" to --$\lambda/16.14n \leq x2 \leq x1$--.

Signed and Sealed this

Sixteenth Day of September, 2008

JON W. DUDAS
*Director of the United States Patent and Trademark Office*